Sept. 27, 1966  W. P. TOLBERT, SR  3,274,917
PROTECTIVE COVER FOR EXHAUST PIPES
Filed Feb. 17, 1964
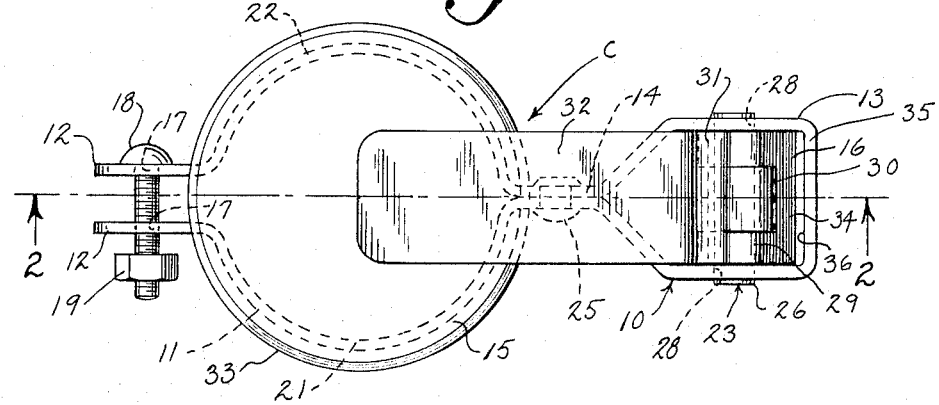
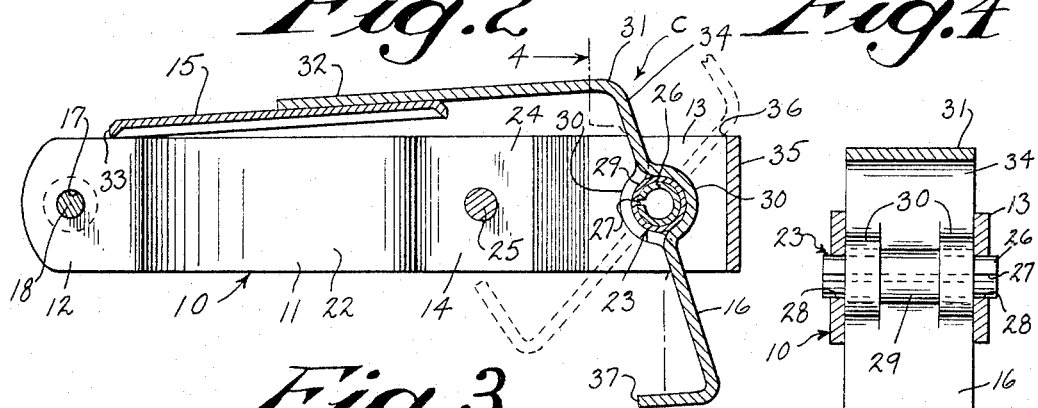
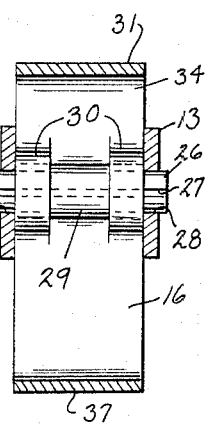
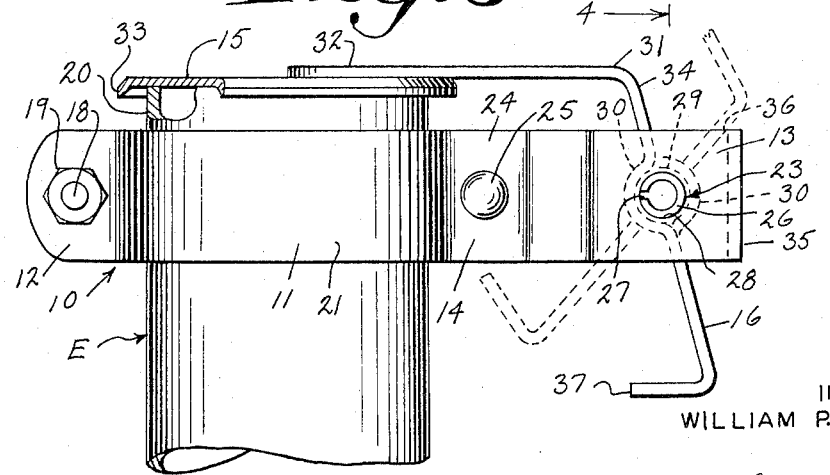
INVENTOR
WILLIAM P. TOLBERT, SR.
BY George W. Wright Jr.

United States Patent Office 3,274,917
Patented Sept. 27, 1966

3,274,917
PROTECTIVE COVER FOR EXHAUST PIPES
William P. Tolbert, Sr., Fort Madison, Iowa, assignor to Gleason Corporation, Milwaukee, Wis., a corporation of Wisconsin
Filed Feb. 17, 1964, Ser. No. 345,462
6 Claims. (Cl. 98—59)

This invention appertains to protective coverings and more particularly to pivoted covers for vertical or horizontal exhaust pipes activated by pressure within the exhaust pipe when said pressure exceeds the external atmospheric pressure.

While pivoted covers of the above nature find many uses such as blow-off devices in the natural gas industry and for the opening end of exhaust pipes of internal combustion engines and the like, and most prevalent use is for the vertical exhaust pipes such as found on tractors and other heavy equipment. There have been many types of pivoted protective covers for the open ends of vertical exhaust pipes developed in the past to exclude foreign matter, insects and the elements. These devices have been designed to meet the problems involving damage to the engine caused by the entry of rainwater, insects and foreign matter through the open end of said vertical exhaust conduit. Not only are there harmful mechanical results due to the presence of the accumulation of such foreign matter within the working parts of the invention, but operative effects typified by failure to ignite, misfire of the spark plugs within the system etc. are traceable to the presence of such accumulated material.

Almost all prior devices therefore include a bracket for fastening the device to the end of the exhaust conduit, a counterbalance or weight for the pivoted cover carried by the bracket and some adjustable means to allow the device to be secured to different sized diameters of exhaust conduits. In order to operate efficiently and effectively the protective cover device must be, in a sense, precision made, and should be relatively rust-proof so as to resist corrosive forces of the elements and exhaust gases. Due to the great variety of devices designed to overcome this problem on the market, the general field has become highly competitive, and therefore, an important disadvantage of all prior devices lies in the relatively high cost of the manufacture and assembly of such devices. The counterbalance must be exact and the cover is subjected to continual opening and closing during engine operation. Thus the parts must be strong and durable. The use of thin metal and poor bushings and bearings will result in an inefficient device that soon will not function properly. Nevertheless, in an effort to make a low cost device, certain prior devices included a U-shaped spring bracket carrying adjustable means at one end and carrying the pivot for the counterweight and cover either adjacent to or at the other end of the bracket and for the sake of economy no means is provided to keep the metal band or split ring from flexing adjacent the pivot point when the same is being adjusted. Therefore, adjusting the bracket does cause a flexing or binding of the pivot and thus the cover fails to either open under slight pressure or when blown open will remain open and fail to close. There are many other problems which must be overcome to provide an efficient device, and therefore, of necessity all prior devices have either been too complicated, too expensive in a competitive market, or if the proper materials were not used, subject to distortion, undue wear and tear with a resultant short life.

Therefore a primary object of my present invention is to provide a pivoted protective cover for a vertical exhaust pipe, which is relatively economical to manufacture, easy to assemble and which overcomes all of the problems found in other known prior devices and is therefore efficient and positive in its operation.

Another object of my present invention resides in providing a band of relatively heavy gauge metal which can be adjusted to different sized exhaust pipe ends without distortion or affecting the bushings and bearing where the cover is pivoted.

A further object of my present invention is to provide a protective covering for vertical exhaust pipes wherein the cover is flanged and rests directly on the end termination of the exhaust pipe and does not engage the split ring or band portion of the bracket.

Still another object of the present invention is to provide a protective cover device wherein the fulcrum for the counterweight and cover is set within a protective and fixed cage of the bracket and therefore is not exposed to flexing and distortion when the band or split ring is adjusted to accommodate the particular size exhaust pipe.

Another object of my present invention is to provide a protective cover wherein the axle or bushing and bearing are in the form of a roll pin which is hardened and expands within aligned apertures of the protective cage and is therefore held tight against rotation by friction and wherein the bearing will rotate about this pin and is of the self-lubricating type.

A further object of my present invention is to provide a protective cover wherein the limit stop for the cover in its open position is the back of the protective cage and part of the bracket, so that the counterweight and the like does not strike or engage portions of the exhaust pipe or under portions of the bracket.

A still further object of my present invention is to provide a protective cover device utilizing relatively inexpensive bearing components and to so position these components to provide maximum protection against adverse operation conditions and to utilize thermally induced outside air movement to achieve this.

Another object of my present invention is to use a roll pin to provide the maximum air flow and heated dissipation through and about the bearing surface, and to so construct and arrange the protective cover so that in its open position it diverts and directs thermally induced air flow directly against the bottom of the bearing surface for maximum heat dissipation.

A further important object of my present invention is to provide a protective cover device which is simple in construction, reliable in operation and not liable to get out of order.

With these and other objects in view, and to the end of attaining any other advantage hereinafter appearing, this invention consists in certain features of construction and arrangement of parts hereinafter described, pointed out in the claims and illustrated in the drawings.

In the drawings,

FIGURE 1 is a top plan view of my novel protective covering clearly illustrating the adjustable bracket and the protective cage for the prvoting means of the cover;

FIGURE 2 is a longitudinal vertical section taken through the device, the section being taken on the line 2—2 of FIGURE 1 of the drawings, and looking in the direction of the arrows;

FIGURE 3 is a side elevational view of my novel protective covering shown in proper position on the end termination of an exhaust pipe or conduit, certain parts being broken away and in section to illustrate details in its operation and construction, and FIGURE 4 is a transverse section taken through my protective cover, the section being represented by the line 4—4 of FIGURE 2 of the drawings, and looking in the direction of the arrows.

Referring to the drawings in detail, wherein similar reference characters designate corresponding parts throughout the several views, the letter C generally indicates one type of my improved protective cover for the end termination of an exhaust pipe or conduit and the same includes broadly a split ring or bracket 10 constructed from a single length of relatively heavy gauge metal bent to form a split ring or band portion 11, forwardly extending ears 12, a protective cage 13 and a bridge portion 14. The clamp or bracket 10 carries the pivoted cover 15 and the counterweight or balance 16.

While the device C may be constructed from any suitable material, as previously brought out, the clamp or bracket 10 is made of a heavy gauge metal so that the opposed ears 12 are biased in a direction away from one another. The ears are formed in a spaced parallel relation and each is provided with an aligned aperture 17 to receive the threaded bolt 18 and its adjusting nut 19. Thus, when the band portion 11 of the bracket 10 is placed about the end termination 20 of the exhaust pipe or conduit E, the band 11 can be split or is split under tension and then by turning the nut 19 the band can be securely tightened about the exhaust pipe E. This space between the ears 12 will of course provide adjustment to accommodate the different sized exhaust pipes.

Obviously, the flexing movement of the stretches 21 and 22 of the band portion 11 (due to this tightening and adjusting), would cause a distortion throughout the entire bracket 10 and thus stress or strain could be placed upon the bushings and bearings 23. To overcome this objection, I provide the aforementioned bridge portion 14 and the same is formed by short parallel extending stretches 24 which are held securely adjacent one another either by spot welding or by a rivet and the like 25. Thus, the bridge portion through the rivet 25 absorbs the distortion and flexing of the stretches of the band 11 and the protective cage 13 remains unmoved and rigid. This assures the fact that the bearings and bushings 23 will be undisturbed and not subject to excessive wear or distortion. To further provide a strong, durable pivot point for the cover 15 and the counterweight 16, I provide a tubular rolled pin 26 carrying a longitudinal split or opening 27 throughout its entire length and this pin 26 forms a hardened bushing which when received in the aligned apertures 28 of the protective cage 13 is expanded and held tight by friction. Prior however, to inserting the pin through the apertures 28 I provide the bushing type bearing 29, and this bearing is in turn received within the formed members 30 of the balance arm 31, and preferably this bushing type bearing is of the self-lubricating type, such as a bearing known as the Oillite bearing, and its fit within the struck out portions 30 of the arm 31 is a press fit so that it will rotate on the hardened pin 26, as the arm is moved from its full line position toward its dotted line position, FIGURE 2 of the drawings.

The construction of the balance arm also forms an important part of my present invention, and it can be seen that the same includes a forwardly extending cover support 32 to which the cover 15 is secured by spot welding or the like. It should be noted that the cover 15 is formed from a circular piece of metal carrying a downwardly extending peripheral flange 33 and the cover is preferably of a size to accommodate and completely enclose an exhaust conduit in which the circumference is the largest for which the device is adapted to accommodate. Thus, the cover will readily seat on the end termination 20 and prevent any foreign matter from entering the conduit when exhaust fumes are not being moved from the opening. From the forwardly extending support 32 of the arm 31 and extending downwardly and angularly therefrom, is the leg 34 part of which forms the counterbalance or weight 16 and the angle of the leg 34 is such that when the cover is moved it is extreme open position, it will engage the rear wall 35 of the protective cage 13 at the point 36 and thus, the striking of the end termination of the counterweight against the under side of the bracket or against portions of the exhaust pipe will be prevented. The entire device is constructed of relatively heavy gauge durable metal and could be plated or otherwise finished, but preferably it is painted with aluminum high temperature paint which resists the exhaust temperatures and corrosion from the elements and the placing of the adjusting bolt and nut 19 on one of the bracket and protective cage carrying the bearings and bushings 23 on the other end of the bracket to provide a strengthening bridge 14 therebetween is again stressed. This feature alone aids measurably in the life of the device and to its effective operation, and since the bracket is formed from a single piece of metal and the cover is secured to the balance arm which likewise is formed from a single piece of metal, it is apparent that my device can be economically manufactured and at the same time overcomes problems that are found in all prior devices.

From the description thus far, it is believed that the operation of the device is evident. However, a brief description of the operation is included for clarification. Attention is directed primarily to FIGURE 3 of the drawings, and the band portion 11 is slipped over the end 20 of the exhaust pipe E and the nut 19 is tightened in such a manner that the cover 15 is evenly seated on the end termination 20 as shown. When the engine is in operation gaseous exhaust fumes are developed which travel up the pipe E and only a slight pressure is needed to move the cover 15 and its support 32 toward the dotted line position. It should also be noted that the wall 35 acts as a stop means when the position of the support arm 32 and cover 15 is such that they will overcome the counterweight 16. Thus, when the entire arm 31 pivots about the bearing assembly 23 to the dotted line position the cover will, in effect, be in an unnatural position and tend to, by its own weight and the fact that it is off center, move back toward the closed position. When the exhaust fumes and pressure cease the cover will automatically and easily return to its closed inoperative position.

It is again to be stressed that when the cover is in its full open position, wall 35 acts as a limit stop at the point 36, which is the greatest distance from the exhaust pipe E. This is important, since under usage and exposure the top section of an exhaust pipe tends to weaken through rust and corrosion, and therefore, minimizing the vibration or impact transmitted to the pipe by constant opening and closing of the cover assures longer exhaust pipe life. Further, the construction of the cover, tubular split pin and bearing arrangement, protection open cage and the location and arrangement of these component parts are such that I utilize to the fullest extend thermally induced air flow for heat dissipation and for greater bearing protection against the adverse effect of trapped heat. My fixed protective cage is designed so that when in the open position of the cap the counterweight is moved into a position whereby the same diverts and directs thermally induced air flow against the bottom of the bearing surface for maximum heat dissipation. It is important, particularly in adverse weather conditions and extreme cold temperatures that heat be transmitted to the bearing surface, but it is equally important that this heat is not trapped and allowed to build up unduly in hotter temperatures. The construction of my device solves both problems. The one-piece construction for example and the aforementioned arrangement of the bearings and open cage and position of the bearings takes advantage of the thermally induced air flow to move and dissipate the heat evenly. Therefore an even distribution and dissipation of heat is the crux of my novel arrangement and design.

To my knowledge, all prior devices locate their bearing members in close proximity to the exhaust pipe or conduit and therefore the heat is not evenly distributed and dissipated by the air flow as in my design.

From the foregoing, it is believed that the features and advantages of my invention will be readily apparent to those skilled in the art, and it will of course, be understood that changes in the form, proportions and minor details of construction may be resorted to without departing from the spirit of the invention or scope of the appended claims.

I claim:

1. An automatic self-closing protective cover assembly adapted to be affixed to the upstanding exhaust pipe of a fuel combustive system to prevent entry of foreign material therein while said fuel combustive system is inoperative comprising; a split ring bracket formed from a single length of heavy gauge metal to include, an open end band portion of a size and configuration to substantially encircle the peripheral surface of said pipe, an open protective cage portion spaced therefrom, and a joining bridge section formed from adjacent parallel stretches of said metal in contacting relationship; a cover normally seated over the discharge end of said pipe closing off the same; a balance arm formed from a single strip of material, means associated with said arm and said protective cage for pivotally mounting said arm intermediate its ends at a point within said protective cage portion, one end of said arm being secured to said cover and forming a support therefor, the other end of said arm extending downwardly and angularly to form a counterbalance for said cover, whereby pressure from exhaust gases will cause said cover to move off the discharge end of said exhaust pipe; means limiting the pivotal movement of said arm; and means for adjustably securing said band portion and bracket to said exhaust pipe.

2. An automatic self-closing protective cover assembly as set forth in claim 1 wherein said means associated with said protective cage and arm for pivotally mounting said arm within said cage portion includes, a tubular pin extending transversely across said cage portion and being expanded within aligned apertures and rigid therewith, and a barrel bearing about said pin and secured to said arm.

3. An automatic self-closing protective cover assembly as set forth in claim 1 wherein said means limiting the pivotal movement of said arm includes, a rear wall forming part of said protective cage portion, and said arm being so constructed and arranged as to contact said rear wall adjacent its upper portion prior to said counterbalance contacting adjacent portions of said bracket and exhaust pipe, whereby vibration and impact transmitted to the pipe by constant opening and closing of the cover is greatly reduced assuring longer exhaust pipe life.

4. An automatic self-closing protective cover assembly as set forth in Claim 1, wherein said means for adjustably securing said band portion and bracket to said exhaust pipe includes, a pair of outwardly extending spaced parallel ears on said band at the opposite end of said protective cage, and an adjusting bolt and nut extending transversely through said spaced ears.

5. An automatic self-closing protective cover assembly adapted to be affixed to an exhaust pipe of a fuel combustive system to prevent entry of foreign material therein while said fuel combustive system is inoperative comprising, a split ring bracket formed from a single length of heavy gauge metal to include, an open end band portion of a size and configuration to substantially encircle the peripheral surface of said pipe, an open protective cage portion spaced therefrom, and a joining bridge section formed from adjacent parallel stretches of said metal in contacting relationship; a cover normally seated over the discharge end of said pipe closing off the same; a balance arm formed from a single strip of material, means including a self-lubricating bearing associated with said arm and said protective cage for pivotally mounting said arm intermediate its ends at a point within said protective cage portion, one end of said arm being secured to said cover and forming a support therefor, the other end of said arm extending downwardly and angularly to form a counterbalance for said cover, whereby pressure from exhaust gases will cause said cover to move off the discharge end of said exhaust pipe; means limiting the pivotal movement of siad arm, said cover and arm being so constructed and arranged that heated air will be diverted by said cover arm and counterbalance against the bearing surface for maximum heat distribution and dissipation; and means for adjustably securing said band portion and bracket to said exhaust pipe.

6. An automatic self-closing protective cover assembly as set forth in claim 5, wherein said cover, arm and counterbalance arrangement includes, an angularly and inwardly extending end termination on said arm, and said arm having a limit stop associated with said protective cage so construced and arranged that when said cover is in its extreme open position a portion of said heated exhaust gases will be diverted to said end termination of the arm and said bearing surface.

References Cited by the Examiner
UNITED STATES PATENTS

| | | | |
|---|---|---|---|
| 908,961 | 1/1909 | Crabtree | 137—537.6 X |
| 1,064,291 | 6/1913 | Conrad | 137—527.6 X |
| 2,983,216 | 5/1961 | Stade et al. | 98—59 |

WILLIAM F. O'DEA, *Primary Examiner.*

D. ZOBKIW, *Assistant Examiner.*